US012186769B2

(12) United States Patent
Iwase

(10) Patent No.: US 12,186,769 B2
(45) Date of Patent: Jan. 7, 2025

(54) SPRAY COATING DEVICE AND SPRAY COATING METHOD

(71) Applicant: FUJIFILM Corporation, Tokyo (JP)

(72) Inventor: Eijiro Iwase, Minamiashigara (JP)

(73) Assignee: FUJIFILM Corporation, Tokyo (JP)

( * ) Notice: Subject to any disclaimer, the term of this patent is extended or adjusted under 35 U.S.C. 154(b) by 123 days.

(21) Appl. No.: 18/161,399

(22) Filed: Jan. 30, 2023

(65) Prior Publication Data

US 2023/0166281 A1 Jun. 1, 2023

Related U.S. Application Data

(63) Continuation of application No. PCT/JP2021/024730, filed on Jun. 30, 2021.

(30) Foreign Application Priority Data

Jul. 31, 2020 (JP) ................................ 2020-130445

(51) Int. Cl.
*B05B 15/18* (2018.01)
*B05B 7/08* (2006.01)
*B05B 13/02* (2006.01)

(52) U.S. Cl.
CPC ........ *B05B 13/0278* (2013.01); *B05B 7/0846* (2013.01); *B05B 13/0221* (2013.01)

(58) Field of Classification Search
CPC ...................................................... B05B 15/18
See application file for complete search history.

(56) References Cited

FOREIGN PATENT DOCUMENTS

| | | | |
|---|---|---|---|
| JP | 56-31469 | A | 3/1981 |
| JP | 3-42071 | A | 2/1991 |
| JP | 10-235252 | A | 9/1998 |
| JP | 2005-46712 | A | 1/2005 |
| JP | 2006-16659 | A | 1/2006 |
| JP | 2016-128149 | A | 7/2016 |

OTHER PUBLICATIONS

International Preliminary Report on Patentability and Written Opinion of the International Searching Authority for International Application No. PCT/JP2021/024730, dated Feb. 9, 2023, with an English translation.

International Search Report for International Application No. PCT/JP2021/024730, dated Sep. 28, 2021, with an English translation,.

*Primary Examiner* — Austin Murata

(74) *Attorney, Agent, or Firm* — Birch, Stewart, Kolasch & Birch, LLP

(57) ABSTRACT

An object is to provide a spray coating device and a coating method, with which a uniform coating film can be formed by spray coating with two liquids having reactivity, and in which precipitation of a reaction product on a periphery can also be prevented. The object is achieved by providing a transporting unit for transporting a substrate downward; a first spray nozzle; a second spray nozzle disposed below the first spray nozzle; a holding plate for holding the first spray nozzle and the second spray nozzle such that an angle formed by center lines of the first spray nozzle and the second spray nozzle is 5° to 150°; and a liquid film forming unit for forming a liquid film which flows from above to below on a surface of the holding plate.

8 Claims, 3 Drawing Sheets

SPRAY COATING DEVICE AND SPRAY COATING METHOD

CROSS-REFERENCE TO RELATED APPLICATIONS

This application is a Continuation of PCT International Application No. PCT/JP2021/024730 filed on Jun. 30, 2021, which claims priority under 35 U.S.C. § 119(a) to Japanese Patent Application No. 2020-130445 filed on Jul. 31, 2020. The above applications are hereby expressly incorporated by reference, in its entirety, into the present application.

BACKGROUND OF THE INVENTION

1. Field of the Invention

The present invention relates to a spray coating device and a spray coating method, which are used for coating or the like of a substrate by hard coating, plating, or the like of the substrate.

2. Description of the Related Art

Various methods have been known as a technology for coating surfaces of various substrates such as a film with a two-part reaction liquid.

For example, plating is also one of the methods, and a method of applying a highly reactive plating liquid by spraying has been proposed.

As an example, JP2006-016659A discloses a two-part electroless silver plating liquid consisting of two types of coating liquids of a silver-containing aqueous solution containing a silver compound and ammonia and a reducing agent-containing aqueous solution containing a reducing agent, in which predetermined ethyleneamines are contained in the silver-containing aqueous solution and/or the reducing agent-containing aqueous solution. JP2006-016659A discloses an electroless silver plating method in which using the two-part electroless silver plating liquid, the silver-containing aqueous solution and the reducing agent-containing aqueous solution are simultaneously sprayed to an object to be plated with the use of a spray gun such as a double head spray gun or a concentric spray gun.

According to the method of JP2006-016659A, the silver-containing aqueous solution and the reducing agent-containing aqueous solution prepared separately are simultaneously sprayed to a surface of the object to be plated so that the spraying positions match, and thus a reduction reaction occurs at the position where both the solutions are sprayed and a silver plating film is formed.

SUMMARY OF THE INVENTION

In order to spray-apply two types of coating liquids having reactivity to form a uniform coating film, it is important to sufficiently mix the two types of coating liquids. According to JP2006-016659A, it is preferable that the silver-containing aqueous solution and the reducing agent-containing aqueous solution to be spray-applied are mixed on the substrate.

However, according to the study by the present inventor, in a case where the two types of coating liquids having reactivity are sprayed from different sprays (spray heads), the mixing on the substrate may be insufficient so that the uniform coating film cannot be formed. The insufficient mixing of the two types of coating liquids having reactivity results in non-uniformity in the film formed by the reaction of the coating liquids.

In addition, it is important to coat the substrate with the coating liquid without waste in order to reduce a production cost, particularly in a case of handling a liquid containing a precious and expensive metal or the like.

In recent years, in the spray coating with some materials, the mainstream of the coating method is electrostatic spraying in which, by applying electricity to the substrate and simultaneously charging the coating liquid (liquid droplets), all the liquid droplets are attracted to the substrate. In this method, an adhesion efficiency of the coating liquid to the substrate reaches nearly 99%.

However, this method cannot be used in a case where it is not possible to apply electricity to the substrate, or in a substrate having almost no conductivity.

In particular, in a case where the substrate is coated with the two types of coating liquids having reactivity, it is difficult to prevent the two types of mixed coating liquids from adhering to a place other than the substrate, for example, a casing which surrounds the coating region. In a case where the two types of coating liquids having reactivity are mixed and adhered to the place other than the substrate, various inconveniences arise, such as the generated reaction product falling and adhering to the substrate, resulting in point defects, and requiring maintenance of the coating device.

An object of the present invention is to solve such problems in the related art, and is to provide a spray coating method that, by spray coating, a substrate can be coated with two types of coating liquids having reactivity, which are in a sufficiently mixed state, to form a uniform coating film, and that can also prevent a product resulting from a reaction of the two types of coating liquids from adhering to a casing surrounding a coating region, the substrate, and the like; and a spray coating device for performing this spray coating method.

In order to solve the problems, the present invention has the following configuration.

[1] A spray coating device comprising:
- a transporting unit for transporting a substrate downward;
- a first spray nozzle for applying a liquid onto the substrate transported by the transporting unit;
- a second spray nozzle for applying a liquid onto the substrate transported by the transporting unit, the second spray nozzle being disposed below the first spray nozzle;
- a holding plate for holding the first spray nozzle and the second spray nozzle such that an angle formed by a center line of the first spray nozzle and a center line of the second spray nozzle is 5° to 150°; and
- a liquid film forming unit for forming a liquid film which flows from above to below on a surface of the holding plate on a substrate side.

[2] The spray coating device according to [1],
- in which a plurality of combinations of the first spray nozzle and the second spray nozzle, which are arranged in a lateral direction, are provided.

[3] The spray coating device according to [1] or [2],
- in which a combination of the first spray nozzle, the second spray nozzle, and the holding plate is provided by sandwiching a transport path of the substrate by the transporting unit.

[4] The spray coating device according to [3],
- in which at least one of the first spray nozzles facing each other and sandwiching the transport path of the substrate or the second spray nozzles facing each other and sandwiching the transport path of the substrate is disposed such that the center lines are at different positions in the lateral direction.

[5] The spray coating device according to any one of [1] to [4], in which the transporting unit transports the substrate along a path including a region where the liquid sprayed by the first spray nozzle and the liquid sprayed by the second spray nozzle are mixed.

[6] The spray coating device according to any one of [1] to [5], in which the holding plate surrounds a transport path of the substrate by the transporting unit.

[7] The spray coating device according to any one of [1] to [6], in which the first spray nozzle and the second spray nozzle are arranged in a vertical direction, and a plate-shaped member is provided between the first spray nozzle and the second spray nozzle.

[8] A spray coating method comprising:

in a case where a first liquid and a second liquid which reacts with the first liquid are spray-applied onto a substrate while transporting the substrate downward, holding a first spray nozzle for applying the first liquid onto the substrate and a second spray nozzle for applying the second liquid onto the substrate from below the first spray nozzle with a holding plate such that an angle formed by a center line of the first spray nozzle and a center line of the second spray nozzle is 5° to 150°; and applying the first liquid and the second liquid onto the substrate while forming, on a surface of the holding plate on a substrate side, a liquid film which flows from above to below.

[9] The spray coating method according to [8], in which the first liquid and the second liquid are applied onto the substrate with a plurality of combinations of the first spray nozzle and the second spray nozzle, which are arranged in a lateral direction.

[10] The spray coating method according to [8] or [9], in which the first liquid and the second liquid are applied onto both surfaces of the substrate.

[11] The spray coating method according to [10], in which at least one of the first spray nozzles facing each other and sandwiching the substrate or the second spray nozzles facing each other and sandwiching the substrate is disposed such that the center lines are at different positions in the lateral direction.

[12] The spray coating method according to any one of [8] to [11], in which the substrate is transported along a path including a region where the liquid sprayed by the first spray nozzle and the liquid sprayed by the second spray nozzle are mixed.

[13] The spray coating method according to any one of [8] to [12], in which a transport path of the substrate is surrounded with the holding plate.

[14] The spray coating method according to any one of [8] to [13], in which the first spray nozzle and the second spray nozzle are arranged in a vertical direction, and a plate-shaped member is provided between the first spray nozzle and the second spray nozzle.

[15] The spray coating method according to any one of [8] to [14], in which the liquid film flowing on the holding plate is a liquid capable of dissolving at least one of the first liquid or the second liquid.

[16] The spray coating method according to any one of [8] to [15], in which the liquid film flowing on the holding plate is water or an aqueous solution.

[17] The spray coating method according to any one of [8] to [16], in which the substrate is a resin film.

[18] The spray coating method according to any one of [8] to [17], in which a thickness of the substrate is 200 μm or less.

[19] The spray coating method according to any one of [8] to [18], in which the first liquid and the second liquid are applied onto the substrate such that a coating film is thicker than the substrate.

According to the present invention, it is possible that by spray coating, a substrate can be coated with two types of coating liquids having reactivity, which are in a sufficiently mixed state, to form a uniform coating film, and it is possible to prevent a product resulting from a reaction of the two types of coating liquids from adhering to a casing surrounding a coating region, the substrate, and the like.

DESCRIPTION OF THE PREFERRED EMBODIMENTS

Hereinafter, a spray coating device and a spray coating method according to embodiments of the present invention will be described in detail based on suitable examples with reference to the accompanying drawings.

In the present invention, a numerical range expressed using “to” means a range including numerical values before and after “to” as a lower limit value and an upper limit value.

Figure 1:
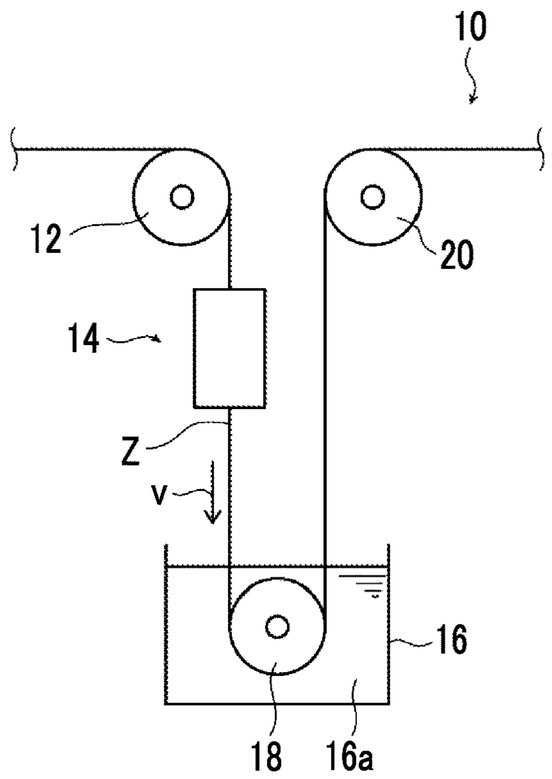
FIG. 1 is a diagram conceptually showing an example of a spray coating device according to the embodiment of the present invention, which implements a spray coating method according to the embodiment of the present invention.

FIG. 1 conceptually shows an example of the spray coating device according to the embodiment of the present invention, which implements the spray coating method according to the embodiment of the present invention.

In a spray coating device 10 shown in FIG. 1, while transporting a long substrate Z in a longitudinal direction, the substrate Z is coated with a first liquid and a second liquid which reacts with the first liquid by spray coating. The above-mentioned "two types of coating liquids having reactivity" means, that is, the first liquid and the second liquid which reacts with the first liquid.

In addition, in the following description, in a case where it is not necessary to distinguish between the first liquid and the second liquid, both of them are collectively referred to as a "coating liquid".

The spray coating device according to the embodiment of the present invention basically implements the spray coating method according to the embodiment of the present invention. However, the spray coating device according to the embodiment of the present invention can be used for spray coating of various coating liquids on the substrate, in addition to implementing the spray coating method according to the embodiment of the present invention.

That is, the spray coating method according to the embodiment of the present invention is that the substrate Z is coated with the two types of coating liquids having reactivity, but the spray coating device according to the embodiment of the present invention is not limited to coating the substrate Z with the two types of coating liquids having reactivity. Therefore, in the spray coating device 10 according to the embodiment of the present invention, the substrate Z may be coated with two types of coating liquids having no reactivity. Alternatively, in the spray coating device 10 according to the embodiment of the present invention, the substrate Z may be coated with the same coating liquid by a first spray nozzle and a second spray nozzle described later. Alternatively, in the spray coating device 10 according to the embodiment of the present invention, the substrate Z may be coated with a coating liquid using only the first spray nozzle or only the second spray nozzle.

In the spray coating device 10 shown in FIG. 1, the substrate Z is guided by a guide roller 12 and transported downward (in a direction of an arrow v) in a vertical direction (top-bottom direction), and along with this, the substrate Z is spray-coated with the first liquid and the second liquid which reacts with the first liquid in an applying portion 14. As described above, in the substrate Z, the longitudinal direction and the transport direction coincide with each other.

Next, the substrate Z coated with the first liquid and the second liquid is immersed and washed with a washing solution 16*a* in a washing tank 16, and the transport direction is changed upward by a guide roller 18 in the washing tank 16.

The substrate Z transported upward is transported to the next step by a guide roller 20.

In the following description, the spray coating device 10 is also simply referred to as a "coating device 10".

In the coating device 10 of the illustrated example, as a preferred aspect, the long substrate Z is used and continuously coated with the coating liquid while being continuously transported in the longitudinal direction as in a so-called roll-to-roll treatment of a material to be treated. However, the present invention is not limited thereto.

That is, in the present invention, the first liquid and the second liquid may be applied while transporting the substrate in a form of a cut sheet.

In the present invention, the substrate Z is not limited, and various sheet-like objects (plate-like objects and films) can be used.

Examples of the substrate Z include resin films such as a polyethylene terephthalate (PET) film, a polyethylene naphthalate (PEN) film, a cycloolefin polymer (COP) film, a polyimide film, a cycloolefin copolymer (COC) film, and a triacetyl cellulose (TAC) film, metal foils such as aluminum foil and copper foil, nonwoven fabric, and paper.

Among these, as the substrate Z, a resin film is suitably used.

A thickness of the substrate Z is also not limited, and may be appropriately selected according to the use of the substrate Z.

Here, in the present invention, even in a case of using a thin substrate Z on which the applied coating film is likely to scatter due to vibration, it is possible to suitably present a product resulting from the reaction of the two types of coating liquids having reactivity from adhering to a casing described later, the substrate Z, and the like. In consideration of this point, the thickness of the substrate Z is preferably 200 μm or less, and more preferably 150 μm or less.

The lower limit of the thickness of the substrate Z is not limited, and a thickness that can be transported and can hold the coating film and the product resulting from the reaction of the coating liquids may be appropriately set according to a material for forming the substrate Z, and the like. The thickness of the substrate Z is usually 5 μm or more.

A transportation speed of the substrate Z is also not limited, and may be appropriately set according to coating property of the coating liquid to the substrate Z, reactivity and applying amount of the two types of the coating liquids, the coating film to be formed, and the like.

In consideration of productivity and the like, the transportation speed of the substrate Z is preferably 0.1 to 100 m/min, more preferably 1 to 50 m/min, and still more preferably 3 to 30 m/min.

As described above, while being transported in the longitudinal direction, the transport direction of the substrate Z is set to downward in the vertical direction by the guide roller 12, and the substrate Z is coated with the two types of coating liquids having reactivity in the applying portion 14 while being transported downward.

In the present invention, the first liquid and the second liquid which reacts with the first liquid are not limited, and various known coating liquids can be used as long as the two types of coating liquids having reactivity.

As an example, a coating liquid which is to a film (coating material) coating at least a part of the substrate Z is exemplified. Examples of the film include electroless metal plating such as silver plating, copper plating, nickel plating, and cobalt plating, hard coatings such as a curable acrylic resin and a curable silanol-based resin, and pressure sensitive adhesives such as an epoxy-based pressure sensitive adhesive and an urethane-based pressure sensitive adhesive.

Therefore, in the present invention, as the coating liquid to be applied to the substrate Z, various known two types of coating liquids capable of producing a desired product by a reaction, such as the film described above, can be used.

For example, in a case where the target product, that is, the film to be formed is electroless metal plating, as an example, the first liquid is a coating liquid containing metal ions for plating, an additive (stabilizer) for improving stability of the metal ions, a pH adjuster, and the like, and the second liquid is a coating liquid containing a reducing agent and the like. The type of the metal ions for plating, contained in the first liquid, can be appropriately selected depending on the type of metal to be precipitated. Examples of the metal ions for plating, contained in the first liquid, include silver ion, copper ion, nickel ion, and cobalt ion. A compound such as silver nitrate, which dissolves in water and generates these ions, is added to the first liquid.

In addition, in a case where the target product, that is, the film to be formed is hard coating, for example, in a case where the substrate Z is coated with a silane film, the first liquid is a coating liquid containing a hard coat material such as alkoxysilane, and the second liquid is a coating liquid containing a curing agent.

Furthermore, in a case where the target product, that is, the film to be formed is a pressure sensitive adhesive, for example, in a case where the substrate Z is coated with a urethane film, the first liquid is a coating liquid containing a pressure sensitive adhesive material such as a urethane-based resin, and the second liquid is a coating liquid containing a curing agent which accelerates a reaction of a terminal isocyanate group.

In the present invention, the terms "first" and "second" in the first liquid and the second liquid have no technical meaning, and in order to distinguish between the two types of the coating liquids having reactivity, the terms "first" and "second" are used for convenience. The same applies to the first spray nozzle and the second spray nozzle in this respect.

Therefore, in the above-described example, for example, in the case of the electroless metal plating, the first liquid and the second liquid may be exchanged, for example, the coating liquid containing the metal ions may be used as the second liquid and the coating liquid containing the reducing agent may be used as the first liquid, and the like.

In addition, the order of application of the first liquid and the second liquid is also not limited, and the first liquid may be used first or the second liquid may be used first. That is, in the present invention, the first spray nozzle may be located downstream in the transport direction of the substrate Z than the second spray nozzle.

As needed, according to substances which react with each other, the first liquid and the second liquid may contain an additive, or may be solutions in which the substances which react with each other are dissolved in a solvent.

The solvent is not limited, and various solvents capable of dissolving components can be used depending on the film generated by the reaction of the two types of the coating liquids. In consideration of the environment, the solvent is preferably water. That is, it is preferable that the first liquid and the second liquid are aqueous solutions.

In addition, the solvents of the first liquid and the second liquid may be the same or different from each other. In consideration of effect of a liquid film F formed in the casing, which will be described later, it is preferable that the solvents of the first liquid and the second liquid are the same. That is, in the first liquid and the second liquid, in a case of using one kind of solvent, the same solvent is preferable, and even in a case of using a plurality kinds of solvents are used, it is preferable to the same solvents for the first liquid and the second liquid and it is more preferable that a ratio of each solvent is the same.

As described above, the substrate Z is guided by the guide roller 12 and transported downward (in the direction of an arrow v) in the vertical direction, and along with this, the substrate Z is spray-coated with the two types of coating liquids having reactivity in the applying portion 14. Next, the substrate Z is immersed and washed with the washing solution 16*a* in the washing tank 16, and the transport direction is changed upward by the guide roller 18 in the washing tank 16. The substrate Z transported upward is transported to the next step by the guide roller 20.

The guide roller 12, the guide roller 18, and the guide roller 20 constitute a transporting unit of the substrate Z according to the present invention.

In the coating device 10 of the illustrated example, the transport direction of the substrate Z in the applying portion 14 is downward in the vertical direction.

However, the present invention is not limited thereto. That is, in the present invention, the transport direction (transport path) of the substrate Z may be tilted with respect to the vertical direction as long as it is up and down direction, in other words, from top to bottom.

Here, in the present invention, it is preferable that the two types of coating liquids having reactivity are applied to both surfaces of the substrate Z. In consideration of ease of coating on both surfaces of the substrate Z, stability of the downward flow of the coating film formed on the substrate Z, prevention of adhering of foreign matter to the substrate Z, efficient collection of scattered coating liquid, and the like, it is preferable that the transport direction of the substrate Z in the applying portion 14 is downward in the vertical direction.

In addition, in consideration of the stability of the downward flow of the coating film formed on the substrate Z, it is preferable that the substrate Z is transported downward in the vertical direction at least from the time the substrate Z enters the applying portion 14 until the substrate Z enters the washing tank 16.

The transport path of the substrate Z after entering the washing tank 16 is not limited, and may be appropriately set according to the configuration of the coating device 10, the installation environment of the coating device 10, the position of a treatment device downstream of the coating device 10, and the like.

As described above, the substrate Z is transported downward in the vertical direction, and along with this, the substrate Z is coated with the two types of coating liquids having reactivity, that is, the first liquid and the second liquid which reacts with the first liquid in the applying portion 14.

Figure 2:
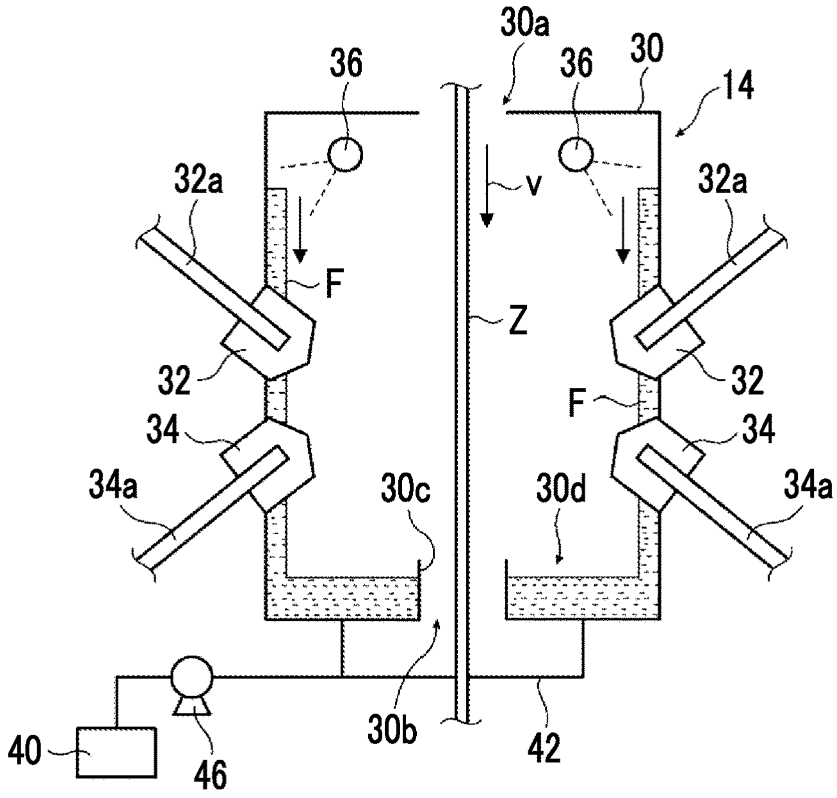
FIG. 2 is a cross-sectional view in a vertical direction, conceptually showing an applying portion of the spray coating device shown in FIG. 1.

FIG. 2 conceptually shows a cross section of the applying portion 14 in the vertical direction. In addition, FIG. 3 conceptually shows a cross section of the applying portion 14 in the horizontal direction.

Figure 3:
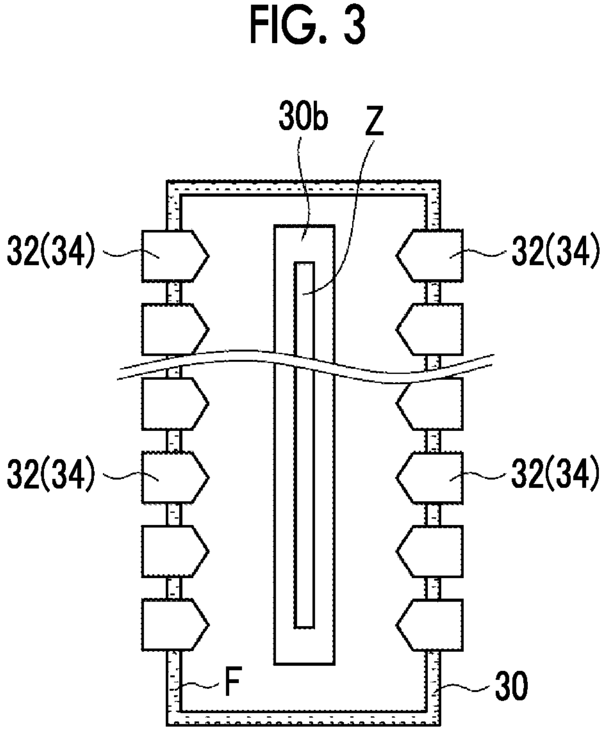
FIG. 3 is a cross-sectional view in a horizontal direction, conceptually showing the applying portion of the spray coating device shown in FIG. 1.

As shown in FIGS. 2 and 3, the applying portion 14 has a casing 30, a first spray nozzle 32, a second spray nozzle 34, and a liquid film forming unit 36.

In the following description, the first spray nozzle 32 will also be referred to as a first nozzle 32, and the second spray nozzle 34 will also be referred to as a second nozzle 34.

The casing 30 is a hollow rectangular housing in which two side surfaces are arranged to be parallel to the surface of the substrate Z, an inlet 30*a* for the substrate Z is formed on a upper surface and an outlet 30*b* for the substrate Z is formed on a lower surface. The surface of the substrate Z is a main surface of the substrate, that is, a surface to be coated. The main surface is the largest surface of the sheet-like object.

As described above, the transport direction of the substrate Z in the applying portion 14 is the vertical direction. Therefore, the casing 30 is disposed with the side surface parallel to the vertical direction.

A shape of the casing 30 is not limited to a rectangular shape, and various shapes can be used as long as discharge ports (spray ports) of the laterally arranged first nozzle 32 and second nozzle 34 can be arranged parallel to the surface of the substrate Z.

The casing 30 is a holding plate in the present invention.

Therefore, the first nozzle 32 is disposed and held in the horizontal direction on a surface of the casing 30, which is parallel to the surface of the substrate Z and corresponds to the entire region of the substrate Z in a width direction. In addition, on the surface of the casing 30, in which the first nozzle 32 is held, the second nozzle 34 forming a one-to-one pair with the first nozzle 32 is horizontally disposed and held below the first nozzle 32 in the vertical direction.

As described above, the substrate Z is transported downward in the vertical direction in a state in which the longitudinal direction corresponds to the transport direction. Therefore, in the coating device 10 of the illustrated example, the first nozzle 32 and the second nozzle 34 are arranged in the horizontal direction, that is, arranged in the width direction of the substrate Z.

In the present invention, the first nozzle 32 and the second nozzle 34 are not limited to being held only by the casing 30 (holding plate), and various configurations can be used.

That is, for example, the coating device 10 may have a member which holds the first nozzle 32 and the second nozzle 34, in addition to the casing 30. Alternatively, in the coating device 10, the holding of the first nozzle 32 and the second nozzle 34 may be mainly performed by another member, and the casing 30 may mainly act as a positioning unit for the first nozzle 32 and the second nozzle 34, and the like. Alternatively, in the coating device 10, the first nozzle 32 and the second nozzle 34 may be held by a member other than the casing 30, and the casing 30 may be a member which regulates a coating space (coating region) of the coating liquid, and may have an opening for inserting the spray ports of the first nozzle 32 and the second nozzle 34 into the coating space of the coating liquid.

The first nozzle 32 and the second nozzle 34 are spray nozzles which spray the coating liquids in order to apply the coating liquids onto the substrate Z. In this example, for convenience, the first nozzle 32 is used to apply the first liquid, and the second nozzle 34 is used to apply the second liquid.

In FIG. 2 and the like, a reference numeral 32*a* is a supply pipe for supplying the first liquid to the first nozzle 32, and a reference numeral 34*a* is a supply pipe for supplying the second liquid to the second nozzle 34. In FIG. 3 (and FIG. 5), the supply pipes are omitted.

In the present invention, the arrangement of the first nozzle 32 (spray port thereof) and the second nozzle 34 (spray port thereof) is not limited in the horizontal direction, and the arrangement may be the lateral direction, that is, a left-and-right direction with respect to the vertical direction (up-and-down direction, top-bottom direction).

That is, the arrangement direction of the first nozzle 32 and the second nozzle 34 may have an angle with respect to the horizontal direction. In addition, in a case of being arranged in the lateral direction, for example, the position of the first nozzle 32 (second nozzle 34) arranged may be shifted in the vertical direction, such as in a zigzag arrangement.

In addition, in the pair of the first nozzle 32 and the second nozzle 34, the second nozzle 34 is not limited to be disposed below the first nozzle 32 in the vertical direction. That is, the second nozzle 34 may be disposed at a position shifted in the horizontal direction from below the pair of the first nozzle 32 in the vertical direction.

However, in consideration of mixing of the first liquid sprayed by the first nozzle 32 and the second liquid sprayed by the second nozzle 34 paired with the first nozzle 32, which will be described later, it is preferable that the second nozzle 34 is disposed below the first nozzle 32 in the vertical direction.

The pair of the first nozzle 32 and the second nozzle 34, that is, the combination of the first nozzle 32 and the second nozzle 34 is a one-to-one combination of the closest nozzles in the horizontal positional relationship.

In the coating device 10 of the illustrated example, as a preferred aspect, the casing 30 which is the holding plate may be provided so as to surround the coating space where the coating liquids are applied by the first nozzle 32 and the second nozzle 34.

However, the present invention is not limited thereto. That is, in the present invention, a plate-like holding plate which holds the first nozzle 32 and the second nozzle 34 and faces one surface of the substrate Z to regulate the coating space may be provided, and a liquid film F described later may be formed on this holding plate. In addition, such a holding plate may be provided corresponding to the both surfaces of the substrate Z.

However, from the reason that it is possible to suitably prevent the mixed two types of coating liquids having reactivity from adhering to anything other than the substrate Z, it is preferable to surround the coating space where the coating liquids are applied by the first nozzle 32 and the second nozzle 34 by the casing 30 which is the holding plate.

In addition, the casing surrounding the coating space where the coating liquids are applied by the first nozzle 32 and the second nozzle 34 may have a tubular shape in which upper and lower surfaces are open. However, for the same reason, it is preferable that, as the casing 30 of the illustrated example, the casing has upper and lower surfaces, and has openings in the upper and lower surfaces through which the substrate Z passes.

Furthermore, as a preferred aspect, the coating device 10 of the illustrated example has the first nozzle 32 and the second nozzle 34 corresponding to the both surfaces (both main surfaces) of the substrate Z, but the present invention is not limited thereto. In other words, the coating device 10 of the illustrated example is a device in which the both surfaces of the substrate Z can be coated with the first liquid and the second liquid, but the present invention is not limited thereto.

That is, the spray coating device according to the embodiment of the present invention may have the first nozzle 32 and the second nozzle 34 corresponding to only one surface of the substrate Z. In other words, the spray coating device according to the embodiment of the present invention may be a device in which only one surface of the substrate Z is coated with the first liquid and the second liquid.

The coating device 10 of the illustrated example is not limited to coating the both surfaces of the substrate Z with the first liquid and the second liquid at all times, and naturally, only one surface of the substrate Z may be used to be coated with the first liquid and the second liquid.

As described above, the first nozzle 32 and the second nozzle 34 are held on the surface of the casing 30 facing the substrate Z. Since the coating device 10 of the illustrated example has the first nozzle 32 and the second nozzle 34 corresponding to the both surfaces of the substrate Z, in the casing 30, the two side surfaces facing the surface of the substrate Z hold the first nozzle 32 and the second nozzle 34.

The casing 30 holds the first nozzle 32 and the second nozzle 34 such that the liquid spray ports (spraying portions) of the first nozzle 32 and the second nozzle 34 protrude slightly from the surface of an inner side surface of the casing 30.

Here, the casing 30 holds the first nozzle 32 and the second nozzle 34 such that a center line of the first nozzle 32 and a center line of the second nozzle 34 which is disposed below the first nozzle 32 in the vertical direction and paired with the first nozzle 32 approach toward the substrate Z.

In addition, the casing 30 holds the first nozzle 32 and the second nozzle 34 such that an angle formed by the center line of the first nozzle 32 and the center line of the second nozzle 34 which is disposed below the first nozzle 32 in the vertical direction and paired with the first nozzle 32 is 5° to 150°. The center line of the nozzle (spray nozzle) is a center line of liquid spraying by the nozzle.

In the following description, the combination of the first nozzle 32 and the second nozzle 34 which is disposed below the first nozzle 32 in the vertical direction and paired with the first nozzle 32 is also simply referred to as "nozzles arranged vertically". In addition, in a case where it is not necessary to distinguish between the first nozzle 32 and the second nozzle 34, both of them are collectively referred to as a "nozzle".

As is well known, the liquid (liquid droplet) sprayed from the spray nozzle spreads as the distance from the nozzle increases. Therefore, the first liquid and the second liquid sprayed by the nozzles arranged vertically spread while traveling in a direction close to each other, and before the center lines of the first nozzle 32 and the second nozzle 34 intersect, the first liquid and the second liquid are mixed in space.

In the coating device 10, the transport path of the substrate Z is set such that the first liquid and the second liquid sprayed by the nozzles arranged vertically pass through the region where the first liquid and the second liquid are mixed.

As described above, in the present invention, the angle formed by the center lines of the nozzles arranged vertically is 5° to 150°. In a case where the angle is 5° or less, inconveniences such as difficulty in sufficiently mixing the first liquid and the second liquid before reaching the substrate Z occur. On the other hand, in a case where the angle exceeds 150°, inconveniences such as that the position where the first liquid and the second liquid are mixed is too close to the nozzle so that a density of the coating liquid is low at the position of the substrate Z, that the coating liquids cannot be applied uniformly, that the coating liquids adhere to the nozzles and cause nozzle clogging, and the like.

The angle formed by the center lines of the nozzles arranged vertically is preferably 10° to 150°, more preferably 10° to 120°, still more preferably 15° to 120°, and particularly preferably 30° to 90°.

Figure 4:
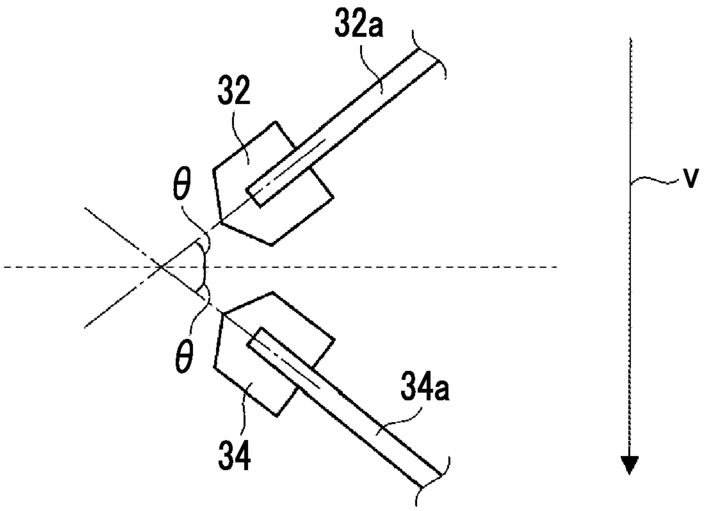
FIG. 4 is a conceptual diagram for explaining a relationship between a center line of a first nozzle and a center line of a second nozzle.

In addition, the present invention is not limited thereto, but as conceptually shown in FIG. 4, it is preferable that the center lines (chain lines) of the first nozzle 32 and the second nozzle 34 arranged vertically have the same angle θ with respect to the horizontal direction indicated by a broken line. For example, in a case where the angle formed by the center lines of the first nozzle 32 and the second nozzle 34 arranged vertically is 60°, it is preferable that both the angle θ formed by the center line of the first nozzle 32 and the horizontal direction and the angle θ formed by the center line of the second nozzle 34 and the horizontal direction are 30°.

In the coating device 10 according to the embodiment of the present invention, the applying portion 14 has the liquid film forming unit 36.

The liquid film forming unit 36 forms a liquid film F which flows from top to bottom on the inner side surface of the casing 30. In the liquid film forming unit 36, the liquid film F is formed so as to flow from at least above the holding position of the first nozzle 32 of the casing 30 and cover the entire side surface.

A thickness of the liquid film F formed on the inner side surface of the casing 30 is such that the spray port (spraying portion) of the liquid droplets of the nozzle held in the casing 30 protrudes from the liquid film F. In other words, the casing 30 (holding plate) holds the nozzle so that the spray port of the liquid droplets of the nozzle protrudes from the liquid film F formed by the liquid film forming unit 36.

In the present invention, the casing 30 (holding plate) holds the first nozzle 32 and the second nozzle 34 such that the angle formed by the center lines is 15° to 150°, the liquid film F flowing from above to below is formed on the inner surface of the casing 30, and the substrate is spray-coated with the coating liquid. In the present invention, by having such a configuration, a uniform coating film (film) can be formed on the substrate by spray coating, and the adhesion of the product of the coating liquid to the casing, the substrate, and the like which surround the coating region is prevented.

As disclosed in JP2006-016659A, it is generally known that the two types of coating liquids having reactivity are spray-applied and the substrate is coated with the product resulting from the reaction. However, it is difficult to form a uniform coating film, that is, a uniform film by the method in the related art. In particular, in a case where the two types of coating liquids have high reactivity, it is difficult to form a uniform film.

The present inventor has made intensive studies on this point. As a result, it has been found that, by sufficiently mixing the liquid sprayed from the spray in a space and then coating the substrate Z, even with two types of coating liquids having high reactivity, a uniform coating film can be formed.

In the present invention, by setting the center lines of the nozzles arranged vertically, that is, the first nozzle 32 and the second nozzle 34 close to the substrate Z and setting the angle formed by the two center lines to 15° to 150°, it allows the liquids sprayed from the spray to be sufficiently mixed in the space. In addition, by setting the transport path of the substrate Z in the space where the liquids sprayed from the first nozzle 32 and the second nozzle 34 are mixed, the substrate Z can be coated with the two types of coating liquids having reactivity, which are in a sufficiently mixed state. As a result, even in a case where the reactivity of the two types of coating liquids is high, a uniform coating film can be formed, and the product resulting from the reaction of the coating liquids can be uniform. For example, in a case of the above-described film coating the substrate Z, the substrate Z can be coated with a uniform film.

Here, the two types of coating liquids mixed in the space do not necessarily selectively adhere to the substrate Z.

That is, the two types of coating liquids having reactivity, which are sufficiently mixed, adhere to a site, for example, the casing forming the coating space for the coating liquid, the supply pipe supplying the coating liquid to the nozzle, and the like, in addition to the substrate Z. Since the two types of coating liquids, which adhere to the respective sites, are sufficiently mixed, a product is generated by the reaction, and the product adheres to the casing and the like. In addition, the product adhering to the casing and the like falls and adheres to the substrate Z, and becomes foreign matter which causes a failure or a defect. This problem is remarkable in the case where the reactivity of the two types of coating liquids is high.

On the other hand, in the coating device 10 according to the embodiment of the present invention, the casing 30 (holding plate) holds the first nozzle 32 and the second nozzle 34 at the above-described angle of the center lines, and on the inner side surface of the casing 30, the liquid film forming unit 36 which forms the liquid film F flowing from above to below and has a thickness not reaching the spray port of the nozzle is provided.

In addition, while forming, by the liquid film forming unit 36, the liquid film F flowing from above to below on the inner side surface of the casing 30, the substrate Z is coated with the coating liquid by spraying the first liquid from the first nozzle 32 and the second liquid from the second nozzle 34.

Therefore, according to the present invention, even in a case where the two types of mixed coating liquids having reactivity are not applied onto the substrate Z but adhere to the inner side surface of the casing 30, since the product is washed away by the liquid film F, it is possible to present the product from adhering to the inner surface of the casing 30.

As a result, according to the present invention, it is possible that by spray coating, a substrate can be coated with two types of coating liquids having reactivity, which are sufficiently mixed, to form a uniform coating film, and it is possible to prevent the product resulting from the reaction of the two types of coating liquids, which is foreign matter, from adhering to the casing 30 surrounding the coating region, the substrate Z, and the like. In addition, since the product resulting from the reaction of the two types of coating liquids does not adhere to the casing 30, maintenance of the coating device 10, such as cleaning, can be significantly simplified.

The liquid film forming unit 36 is not limited, and various known methods capable of forming the liquid film F flowing from above to below on the entire inner side surface of the casing 30 can be used.

Examples of the liquid film forming unit 36 include a water supply unit having a long shower nozzle and liquid supply through-holes arranged in a longitudinal direction on the side of a pipe, and a unit which overflows liquid inside from a gutter (flow channel) surrounding the outer surface of the upper end of the casing 30.

The thickness of the liquid film F is also not limited, and as described above, a thickness that can cover the entire inner side surface (corresponding side surface) of the casing 30 and that the liquid film does not cover the spray port of the nozzle may be set appropriately.

A temperature of the liquid forming the liquid film F is not limited. Therefore, the temperature of the liquid forming the liquid film F may not be controlled, or the temperature may be appropriately controlled according to temperatures of the first liquid and/or the second liquid.

The temperature of the liquid forming the liquid film F is preferably 15° C. to 30° C.

By setting the temperature of the liquid forming the liquid film F to 15° C. to 30° C., it is possible to prevent dew condensation of the first liquid and the second liquid inside the casing 30, and by a recovery mechanism described later, it is possible to more suitably recover the first liquid and/or the second liquid. As a result, the foreign matter which is the defect adhering to the substrate Z can be suppressed.

The liquid forming the liquid film F is also not limited, and various liquids such as water, for example, distilled water, tap water, pure water, ion exchange water, and the like, aqueous solutions, for example, a pH adjusting liquid, and organic solvents, for example, ethyl alcohol can be used.

Here, the liquid forming the liquid film F is preferably a liquid capable of dissolving the first liquid or the second liquid, more preferably a liquid capable of dissolving the first liquid and the second liquid. Therefore, for example, in a case where the first liquid and/or the second liquid is an aqueous solution, the liquid forming the liquid film F is preferably water or an aqueous solution.

As a result, the adhesion of the product to the casing 30 can be suitably suppressed, and by the recovery mechanism described later, it is possible to more suitably recovery the first liquid and/or the second liquid.

In the coating device 10 shown in FIG. 1, as shown in FIGS. 2 and 3, the rectangular casing 30 is provided so as to surround the space where the substrate Z is coated with the coating liquid from the first nozzle 32 and the second nozzle 34, and the liquid film F is formed on all four side surfaces.

However, the present invention is not limited thereto. For example, in the coating device according to the embodiment of the present invention, the liquid film forming unit 36 may be provided only on two side surfaces of the casing 30, which hold the first nozzle 32 and the second nozzle 34, to form the liquid film F. Alternatively, in the coating device according to the embodiment of the present invention, the liquid film forming unit 36 may be provided only on one side surface of the casing 30, which holds the first nozzle 32 and the second nozzle 34, to form the liquid film F.

However, from the viewpoint that it is possible to prevent the adhesion of the product to the inner surface of the casing 30 and each member of the coating device 10, and as a result, it is possible to suitably prevent occurrence of defects due to the foreign matter adhering to the substrate Z and it is possible to simplify the maintenance of the coating device 10, and the like, it is preferable that, as shown in the illustrated example, the rectangular casing surrounding the coating space is provided, the liquid film forming unit 36 is provided corresponding to all the inner surfaces, and the liquid film F is formed on all the inner side surfaces.

In the present invention, a temperature inside the casing 30 and an atmosphere such as humidity and vapor pressure may be controlled as necessary.

This is preferable in that the reactivity between the first liquid and the second liquid can be improved, the dew condensation of the substrate Z can be prevented, the dew condensation of the first liquid and the second liquid inside the casing 30 can be prevented, and the like.

A temperature controlling unit and an atmosphere controlling unit such as humidity are not limited, and various known methods can be used.

In the illustrated example, the side surface of the casing 30 extends in the vertical direction, but may have an angle with respect to the vertical direction as long as it extends in the up-and-down direction.

However, in consideration of ease of removing the product by the liquid film F, that is, ability to prevent the foreign matter from adhering to the substrate Z, and the like, it is preferable that the side surface of the casing 30 (holding plate) extends in the vertical direction.

In the present invention, a spray system (spray method) in the first nozzle 32 for spraying (applying) the first liquid and the second nozzle 34 for spraying the second liquid is not limited, and various known spray systems (spray coating unit, spray nozzle) can be used.

As an example, as the spray system, various known methods such as a one-fluid spray system, a two-fluid spray system, an ultrasonic spray system, a capacitance spray system, and a centrifugal spray system can be used.

Among these, from the viewpoint that fine liquid droplets can be sprayed, the first liquid and the second liquid can be suitably mixed to improve reactivity, that is, productivity, uniformity of the coating film, that is, the product resulting from the reaction of the coating liquid can be achieved, degree of freedom in adjusting liquid droplet size is high, it is easy to control the temperature of the coating liquid, and the like, an ultrasonic spray system is suitably used.

The first nozzle 32 and the second nozzle 34 are basically spray nozzles of the same system, but different systems of spray nozzles may be used as necessary.

In the present invention, a coating film thickness of the coating liquid (the first liquid and the second liquid) applied onto the substrate Z is not limited, and may be appropriately set according to the use of the substrate Z, the type of the product resulting from the reaction of the coating liquid, such as the film, the thickness of the product resulting from the reaction of the coating liquid, such as the film, and the like.

In the present invention, the coating film may be thicker than the substrate Z as necessary.

In the present invention, the temperature of the coating liquid sprayed from the spray is not limited. Therefore, the temperature of the coating liquid may not be controlled, or the temperature of the first liquid and/or the second liquid may be appropriately controlled as necessary.

It is preferable that the coating liquid sprayed from the spray is heated. By heating the coating liquid sprayed from the spray, it is preferable from the viewpoint that the first liquid and the second liquid can be suitably mixed, the reactivity of the first liquid and the second liquid can be improved, the nozzle clogging of the spray can be eliminated, and the like. That is, by heating the coating liquid, productivity can be improved.

In the coating device 10 of the illustrated example, as a preferred aspect, the applying portion 14 (casing 30) has a recovery mechanism for the liquid forming the liquid film F.

By having the recovery mechanism for the liquid forming the liquid film F, the product which is the foreign matter can be prevented from remaining inside the casing 30, that is, in the coating space of the coating liquid, and the foreign matter which is defects can be prevented from adhering to the substrate Z. In addition, in a case where the liquid forming the liquid film F can dissolve the first liquid and/or the second liquid, by recovering the liquid forming the liquid film F, the coating liquid can also be recovered, and waste of the coating liquid can be prevented.

In the coating device 10 of the illustrated example, the casing 30 has a wall portion 30*c* which stands up so as to surround the outlet 30*b* for the substrate Z, and the wall portion 30*c* and the inner side surface of the casing 30 form a liquid pool 30*d* on a bottom surface of the casing 30. A recovery pipe 42 which communicates with the liquid pool 30*d* and communicates with a recovery tank 40 is provided. A pump 46 is disposed in the middle of the recovery pipe 42.

The wall portion 30*c*, the recovery tank 40, the recovery pipe 42, and the pump 46 constitute the recovery mechanism for the liquid forming the liquid film F. That is, in a case where an amount of the liquid stored in the liquid pool 30*d* reaches a predetermined amount, the pump 46 is driven to send the liquid collected in the liquid pool 30*d* to the recovery tank 40 by the recovery pipe 42 for recovery. The amount of the liquid in the liquid pool 30*d* may be determined by a known method such as a weight measurement, a liquid level detection using a known sensor, a flow rate detection based on a coating time of the coating liquid, and the like. Alternatively, the pump 46 may not be provided, and the liquid stored in the liquid pool 30*d* may be sent to the recovery tank 40 by free fall with the recovery pipe 42.

The recovery unit for the liquid forming the liquid film F is not limited to the configuration of the illustrated example, and various known methods can be used.

As described above, in the present invention, by spray coating, the substrate Z is coated with the product resulting from the reaction of the coating liquid by applying the two types of liquids (the first liquid and the second liquid) having reactivity onto the substrate Z transported in the vertical direction.

In addition, the nozzles (the first nozzle 32 and the second nozzle 34) are arranged in the horizontal direction (lateral direction), that is, in the width direction of the substrate Z. As described above, the substrate Z is transported such that the longitudinal direction and the transport direction coincide with each other. Therefore, the sprays are arranged in the width direction of the substrate Z.

Here, the film thickness of the coating film applied to the substrate Z by spraying is not always uniform. That is, the film thickness of the coating film obtained by spraying tends to be the thickest at the position of the center line and gradually decreases from this position.

As described above, in the applying portion 14 of the coating device 10, the nozzles are arranged in the horizontal direction, that is, in the width direction of the substrate Z. In addition, the coating device 10 is a device capable of coating the both surfaces of the substrate Z with the coating liquid, and as conceptually shown in FIG. 3, the nozzles facing each other and sandwiching the substrate Z are arranged at the same position in the horizontal direction, and the center lines thereof coincide with each other.

Therefore, in the coating device 10 of the illustrated example, in a case where the both surfaces are coated with the coating liquid, a first surface and a second surface of the substrate Z have the same unevenness, and thick and thin portions of the coating film are alternately formed in stripes in the width direction. That is, in a case where the substrate Z and the coating film are viewed integrally, it has a shape in which thick portions and thin portions are alternately arranged in stripes in the width direction of the substrate Z.

In a case where such unevenness of the coating film thickness, that is, distribution of the thickness occurs, the transporting is unstable, vibration of the substrate Z occurs, and the coating liquid is easily scattered from the coating film applied onto the substrate Z. The coating liquid scattered from the substrate Z may be reacted to be the product same as the above-described coating liquid not applied onto the substrate Z, which may be the foreign matter adhering to the substrate Z.

This inconvenience is likely to occur in a case where the substrate Z is thin, particularly in a case where the thickness of the substrate Z is 200 μm or less. In addition, this inconvenience is likely to occur in a case where the substrate Z is thin and the coating film is thick, particularly in a case where the coating film thickness is larger than the thickness of the substrate Z.

Figure 5:
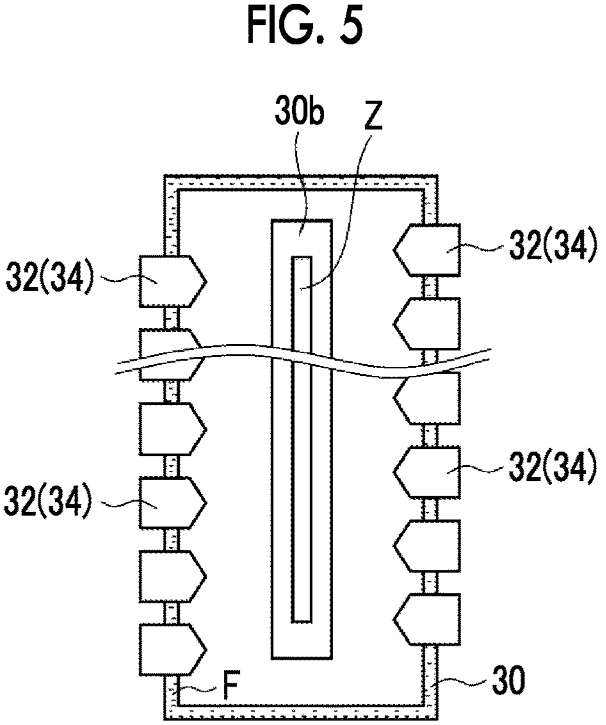
FIG. 5 is a cross-sectional view in a horizontal direction, conceptually showing another example of the applying portion of the spray coating device according to the embodiment of the present invention.

Corresponding to this, in the present invention, as conceptually shown in FIG. 5, it is preferable that the nozzles facing each other and sandwiching the substrate Z, that is, the transport path of the substrate Z are arranged such that the center lines thereof are at different positions in the horizontal direction (lateral direction). That is, in the present invention, as conceptually shown in FIG. 5, it is preferable that the nozzles facing each other and sandwiching the substrate Z are arranged such that the center lines thereof are alternated in the horizontal direction.

In other words, in the present invention, it is preferable that, in a case of being viewed from a direction orthogonal to the arrangement direction of the nozzles, the nozzles are arranged such that the nozzles facing each other and sandwiching the substrate Z are alternated in the arrangement direction. That is, in the present invention, it is preferable that, in a case of being viewed from a direction orthogonal to the arrangement direction of the nozzles, the nozzles are arranged such that the nozzles facing each other and sandwiching the substrate Z are alternately positioned in the arrangement direction.

With such a configuration, on the first surface and the second surface of the substrate Z, the positions where the coating film is thick and the positions where the coating film is thin, that is, the unevenness can be positioned at different positions in the width direction of the substrate Z, and the vibration of the substrate Z as described above can be prevented and the scattering of the coating liquid from the substrate Z can be prevented.

In a case where the nozzles facing each other and sandwiching the substrate Z are arranged such that the center lines thereof are at different positions in the horizontal direction, this arrangement may be for the first nozzles 32 only, for the second nozzles 34 only, or for both the first nozzles 32 and the second nozzles 34.

However, from the viewpoint that the vibration of the substrate Z can be suppressed by reducing the distribution of the coating film thickness in the width direction, the first nozzle 32 and the second nozzle 34 positioned above and below can be arranged in the vertical direction, and the like, it is preferable that the nozzles facing each other and sandwiching the substrate Z are arranged such that the center lines of both the first nozzle 32 and the second nozzle 34 are at different positions in the horizontal direction.

In the present invention, it is preferable that the substrate Z is coated with the first liquid and the second liquid by the first nozzle 32 and the second nozzle 34 arranged above and below in the vertical direction.

As described above, both the first nozzle 32 and the second nozzle 34 are spray nozzles such as an ultrasonic spray.

Here, for various reasons, the coating device 10 needs to stop the spraying of the coating liquid from the nozzle. For example, in a case where the coating device 10 is a device which utilizes the above-described roll-to-roll, after a substrate roll for supplying the substrate Z is over, it is necessary to stop the coating of the substrate Z with the coating liquid by spraying and load a new substrate roll.

In a case where the coating by spraying is stopped, the spraying of the coating liquid from the nozzle is not stopped at the same time as the driving of the spraying is stopped, and as the driving of the spraying is stopped, the spraying is gradually weakened and the spraying of the coating liquid from the nozzle is stopped after a certain amount of time has passed. In this case, before the spraying of the coating liquid from the nozzle is stopped, the liquid droplets are dropped from the nozzle.

It is preferable that the first nozzle 32 and the second nozzle 34 are positioned above and below in the vertical direction. Therefore, the liquid droplets dropped from the first nozzle 32 may adhere to the second nozzle 34 and block the spray port.

Figure 6:
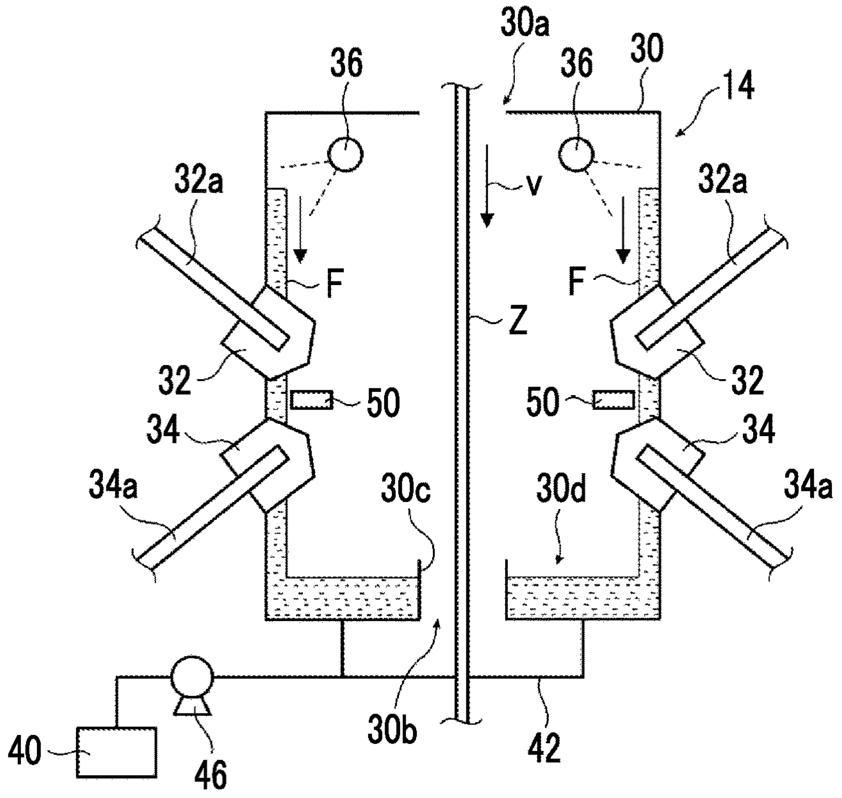
FIG. 6 is a cross-sectional view in a vertical direction, conceptually showing another example of the applying portion of the spray coating device according to the embodiment of the present invention.

In order to avoid such inconvenience, in the coating device 10, as conceptually shown in FIG. 6, it is preferable that a plate-shaped member 50 is provided between the spray ports of the first nozzle 32 and the second nozzle 34, which are arranged in the vertical direction, so that the adhesion of the liquid droplets dropped from the first nozzle 32 to the second nozzle 34 is prevented.

As a result, in a case where the spraying of the coating liquid from the first nozzle 32 is stopped, the liquid droplets dropped from the first nozzle 32 can be prevented from adhering to the second nozzle 34.

A shape of the plate-shaped member 50 is not limited to the flat plate-like shape, and may be curved or may have a bent portion.

In addition, as an example, the plate-shaped member 50 may be provided for each combination of the first nozzle 32 and the second nozzle 34. Alternatively, the plate-shaped member 50 may be provided for each combination of a plurality of sets of the first nozzle 32 and the second nozzle 34. Alternatively, one plate-shaped member 50 may be provided corresponding to the combination of all the first nozzles 32 and the second nozzles 34 arranged in the lateral direction.

The plate-shaped member 50 may be fixed by using a known method according to the shape, size, and the like of the plate-shaped member 50, such as a method of providing a beam for fixing the plate-shaped member 50 at a position which does not interfere with the spraying of the coating liquid.

As a preferred aspect, the substrate Z which has been coated with the product resulting from the reaction of the coating liquid (the first liquid and the second liquid) applied in the applying portion 14 is then immersed in the washing solution **16*a* and washed in the washing tank 16**.

As a result, foreign matter such as excess products adhering to the substrate Z is removed. In particular, as in the illustrated example, in a case where the coating liquid is applied while the substrate Z is transported downward, since the product which is the foreign matter is flowed downward by gravity, the washing in the washing tank 16 can more suitably remove the foreign matter.

In addition, the reaction between the first liquid and the second liquid may be stopped by the washing.

The washing solution is not limited, and may be appropriately selected depending on the coating liquid applied to the substrate Z.

Examples of the washing solution include a solvent of the first liquid and the second liquid, a liquid capable of dissolving components contained in the first liquid and the second liquid, a liquid which stops the reaction between the first liquid and the second liquid, and a harmless liquid which does not dissolve the first liquid and the second liquid (for example, pure water).

A method of washing the substrate Z coated with the product resulting from the reaction of the coating liquid is not limited to the immersion in the washing solution **16*a***. That is, as the method of washing the substrate Z, various known methods such as washing by jetting the washing solution onto the substrate Z, washing by jetting a gas, and wiping off the washing solution can be used.

Depending on the coating liquid applied onto the substrate Z, after applying the coating liquid by the applying portion 14, instead of washing the substrate Z, drying, light curing, heat curing, curing by a heating steam treatment, compression by press roll, or the like may be performed on the product resulting from the reaction of the two types of coating liquids.

These treatments may be performed instead of the washing of the substrate Z, or may be performed before or after washing of the substrate Z. In addition, these treatments including washing may be performed plural times.

The substrate Z is transported upward in the vertical direction through a folded transport path by the guide roller 18 disposed inside the washing tank 16, and is transported to the next step in the subsequent stage, with the transport direction changed to the horizontal direction by the guide roller 20.

The next step performed on the substrate Z which has been coated with the product resulting from the reaction of the two types of coating liquids by the coating device (spray coating method) according to the embodiment of the present invention is not limited. Examples of the next step include the same coating device, a winding device of the substrate Z, a protective layer forming device, a calender treatment device, a slit device, a foreign matter removing device, a dust removing device, and a surface inspection treatment.

As described above, the coating device 10 according to the embodiment of the present invention basically implements the spray coating method according to the embodiment of the present invention. Therefore, in the coating device 10 according to the embodiment of the present invention, basically, while forming the liquid film F on the inner side surface of the casing 30 by the liquid film forming unit 36, the first liquid is sprayed from the first nozzle 32 and the second liquid is sprayed from the second nozzle 34, so that the substrate Z is coated with the two types of coating liquids having reactivity.

However, as described above, the spray coating device according to the embodiment of the present invention can be used for spray coating and the like of various coating liquids on the substrate, in addition to implementing the spray coating method according to the embodiment of the present invention.

Therefore, in the coating device 10, without forming the liquid film F on the inner side surface of the casing 30 by the liquid film forming unit 36, the coating liquid may be sprayed from the first nozzle 32 and/or the second nozzle 34, so that the substrate Z is coated with the coating liquid. In addition, in the coating device 10, for example, for the purpose of cleaning the coating device 10, the coating liquid may be not sprayed from the first nozzle 32 and/or the second nozzle 34, and the liquid film F may be formed on the inner side surface of the casing 30 by the liquid film forming unit 36.

Although the spray coating device and the spray coating method according to the embodiments of the present invention have been described above in detail, the present invention is not limited to the above aspects, and various improvements and modifications may be made without departing from the gist of the present invention.

The present invention can be suitably used as a method of forming a film for imparting and improving decorative properties, durability, conductivity, and the like in a sheet-like object used for various products.

EXPLANATION OF REFERENCES

10: (spray) coating device
12, 18, 20: guide roller
14: applying portion
16: washing tank
16*a*: washing solution
30: casing
30*a*: inlet
30*b*: outlet
30*c*: wall portion
30*d*: liquid pool
32: first (spray) nozzle
32*a*, 34*a*: supply pipe
34: second (spray) nozzle
40: recovery tank
42: recovery pipe
46: pump
50: plate-shaped member
F: liquid film
Z: substrate

What is claimed is:

1. A spray coating device comprising:
a transporting unit for transporting a substrate downward;
a first spray nozzle for applying a liquid onto the substrate transported by the transporting unit;
a second spray nozzle for applying a liquid onto the substrate transported by the transporting unit, the second spray nozzle being disposed below the first spray nozzle;
a holding plate for holding the first spray nozzle and the second spray nozzle such that an angle formed by a center line of the first spray nozzle and a center line of the second spray nozzle is 5° to 150°; and
a liquid film forming unit for forming a liquid film which flows from above to below on a surface of the holding plate on a substrate side.

2. The spray coating device according to claim 1,
wherein a plurality of combinations of the first spray nozzle and the second spray nozzle, which are arranged in a lateral direction, are provided.

3. The spray coating device according to claim 2,
wherein a combination of the first spray nozzle, the second spray nozzle, and the holding plate is provided by sandwiching a transport path of the substrate by the transporting unit.

4. The spray coating device according to claim 1,
wherein a combination of the first spray nozzle, the second spray nozzle, and the holding plate is provided by sandwiching a transport path of the substrate by the transporting unit.

5. The spray coating device according to claim 4,
wherein at least one of the first spray nozzles facing each other and sandwiching the transport path of the substrate or the second spray nozzles facing each other and sandwiching the transport path of the substrate is disposed such that the center lines are at different positions in the lateral direction.

6. The spray coating device according to claim 1,
wherein the transporting unit transports the substrate along a path including a region where the liquid sprayed by the first spray nozzle and the liquid sprayed by the second spray nozzle are mixed.

7. The spray coating device according to claim 1,
wherein the holding plate surrounds a transport path of the substrate by the transporting unit.

8. The spray coating device according to claim 1,
wherein the first spray nozzle and the second spray nozzle are arranged in a vertical direction, and
a plate-shaped member is provided between the first spray nozzle and the second spray nozzle.

* * * * *